United States Patent [19]
Lim

[11] Patent Number: 5,995,851
[45] Date of Patent: Nov. 30, 1999

[54] OUTDOOR RECEIVER SYSTEM OF A MOBILE COMMUNICATION BASE STATION

[76] Inventor: Jae-bong Lim, Jugong Apt. 525-1110, Jamsil 5-dong, Songpa-gu, Seoul, Rep. of Korea

[21] Appl. No.: 08/815,294

[22] Filed: Mar. 12, 1997

[30] Foreign Application Priority Data

Mar. 13, 1996 [KR] Rep. of Korea ......................... 96-6650
Jul. 18, 1996 [KR] Rep. of Korea ....................... 96-29053

[51] Int. Cl.$^6$ ..................................................... H04B 7/00
[52] U.S. Cl. .......................... 455/561; 455/347; 343/890; 343/872
[58] Field of Search ..................................... 455/254, 283, 455/296, 501, 5, 1, 3.3, 5.61; 348/12, 13; 343/890; 333/99 R, 99 S

[56] References Cited

U.S. PATENT DOCUMENTS

| | | | |
|---|---|---|---|
| 3,866,136 | 2/1975 | Augustin et al. | 330/298 |
| 3,902,143 | 8/1975 | Fletcher et al. | 333/21 R |
| 3,931,623 | 1/1976 | Sones et al. | 370/318 |
| 4,122,400 | 10/1978 | Medendorp et al. | 330/207 P |
| 4,364,234 | 12/1982 | Reed | 62/3.3 |
| 5,006,825 | 4/1991 | Guilbert et al. | 333/245 |
| 5,061,630 | 10/1991 | Knopf et al. | 422/99 |
| 5,345,591 | 9/1994 | Tsurumaki et al. | 455/3.2 |
| 5,483,799 | 1/1996 | Dalto | 62/3.7 |
| 5,523,916 | 6/1996 | Kaczmarek | 361/119 |
| 5,604,925 | 2/1997 | O'Malley et al. | 257/10 |
| 5,666,355 | 9/1997 | Huah et al. | 370/311 |
| 5,812,373 | 9/1998 | Hwang | 361/704 |

OTHER PUBLICATIONS

Simmons, Jr., James P. and Madden, Joseph M., "Practical HTS/Cryogenic Systems for Wireless Applications", Superconductor Technologies Inc., Santa Barbara, California 93111.

Walker, Graham, "Cryocoolers Part 1: Fundamental", Plenum Press, New York (1983), Figs. 5a, 6–8 and Endnotes.

"Reach™: A High–Performance Wireless Base Station Front End, Benefits Analysis For A CDMA–Based PCS Network", SCT, Inc. Golden, Colorado (1995) pp. 1–12, A1–1, A1–2, A2–1 to A2–5, A3–1 to A3–15 and A4–1 to A4–3.

*Primary Examiner*—William G. Trost
*Assistant Examiner*—Sonny Trinh
*Attorney, Agent, or Firm*—Dilworth & Barrese

[57] ABSTRACT

This invention relates to a receiver system in a base station which receives signals of such a mobile communication as an Analogy Cellular, a Digital Cellular, a Code Division Multiple Access (CDMA) Cellular, a Personal Communication Service (PCS), a Trunked Radio System (TRS), a Dual Paging, and a Wireless Local Loop (WLL).

when the receiver system of the mobile communication base station is established outdoors, by establishing a thermal electric module with small volume, light weight, high reliability, and excellent durability in a bandpass filter (or duplex filter), a low noise amplifier, or a low-converter to be maintained at a constant temperature without a need of a refrigerant and such a mechanical driving portion as a condenser fan and employing a control circuit for controlling the thermal electric module within a proper temperature range, the outdoor receiver system can be operated in a constant temperature range so that the deterioration of characteristics caused by the change of temperature of the receiver system under a poor outdoor environment can be protected.

17 Claims, 12 Drawing Sheets

OUTDOOR RECEIVER SYSTEM OF A MOBILE COMMUNICATION BASE STATION

BACKGROUND OF THE INVENTION

1. Field of the Invention

This invention relates to a receiver system in a mobile communication base station which receives signals of such a mobile communication as an Analog Cellular, a Digital Cellular, a Code Division Multiple Access (CDMA) Cellular, a Personal Communication Service (PCS), a Trunked Radio System (TRS), a Dual Paging, and a Wireless Local Loop (WLL) and more particularly, to an outdoor receiver system of a mobile communication base station which prevents the deterioration of the characteristics of the receiver system due to a variation of external environment by establishing the receiver system of the base station outdoors and keeping its temperature constant all the time by use of a thermal electric module so that a maximal communication distance for up-link may be increased.

2. Description of the Related Art

Typically, in such a mobile communication service as an Analog Cellular, a Code Division Multiple Access Cellular (CDMA), a Personal Communication Service (PCS), a Trunked Radio System (TRS), a Dual Paging, a Wireless Local Loop (WLL), a transmitter system in the base station transmits large output signals by using a power amplifier with large output so that a portable terminal in a mobile station at a long distance from the base station can receive the signals. In the portable terminal in the mobile station, however, due to the constraint on capacity of a battery and size of the portable terminal, a large power output is impossible but an output with only an order of several hundred milliwatts to several watts can be generated. As a result, a distance at which signals transmitted from the portable terminal in the mobile station can be received in the receiver system in the base station become relatively very short.

For a mobile communication service, the difference in a communication distance between a down-link from the base station to the mobile station and an up-link from the mobile station to the base station requires that more base stations should be established, resulting in the increase of the costs of establishment, maintenance and repair.

Under such the circumstances, for the purpose of reducing the difference in the communication distance between the down-link and the up-link, studies have put emphasis upon less noise figure of a Low-Noise Amplifier (LNA) and less insertion loss of a BandPass Filter (BPF) or Duplexer Filter to improve reception sensitivity of the receiver system in the base station.

However, as shown in FIG. 1, an existing receiver system in the base station has a bandpass filter, a low noise amplifier, and a down converter, etc., located indoors, a coaxial cable of 10 ~several ten meters with insertion loss in order of several dBs is connected between an antenna located at a tower and the receiver system of the base station. Accordingly, the insertion loss of the coaxial cable is reflected, as it stands, in a total noise figure of the receiver system, resulting in the increase of noise figure by the insertion loss of the coaxial cable.

The total reception noise figure in the receiver system connected as shown in FIG. 1 can be expressed as follow:

$$NF_{total} \approx L_c + L_b + NF_1$$

Where, Lc indicates the insertion loss of the coaxial cable, Lb indicates an insertion loss of the bandpass filter, and NF1 indicates a noise figure of the low noise amplifier.

For example, in the case where the insertion loss of the coaxial cable Lc≈4 dB, the insertion loss of the bandpass filter Lb≈1 dB, the noise figure of the low noise amplifier NF1≈1 dB, and a gain of the low noise amplifier G1≈40 dB, then the total noise figure $NF_{total}$ of the receiver system is obtained as follows by using the above expression.

$$NF_{total} \approx 4+1+1 \approx 6 \text{ dB.}$$

At this time, as the gain of the low noise amplifier is very large as 40dB, noise figures in the down-converter and the followings make little contribution to the total reception noise figure of the receiver system.

Accordingly, with only the method by which the insertion loss of the bandpass filter is reduced or the noise figure of the low noise amplifier is decreased in the receiver system connected as shown in FIG. 1, the total reception noise figure of the receiver system in the base station can not be lowered any more, and then the increase of the maximal communication distance for the up-link by the improvement of the reception sensitivity can not be expected any more.

A method for overcoming such a shortcoming is to establish the bandpass filter and low noise amplifier (BPF+LNA) or the bandpass filter, low noise amplifier, and down-converter (BPF+LNA+D/C) (not shown) at a location (outdoors) as close as possible to the receiving antenna as shown in FIG. 2 so that the noise figure of the receiver system by the insertion loss of the coaxial cable may be reduced. This has been known to be the only method to improve significantly the reception sensitivity of the receiver system in the base station.

Under such circumstances, similar to the case described with respect to FIG. 1, in the case where the insertion loss of the coaxial cable Lc≈4 dB, the insertion loss of the bandpass filter Lb≈1 dB, the noise figure of the low noise amplifier NF1≈1 dB, the gain of the low noise amplifier G1≈40 dB, then the total reception noise figure (NF' total) of the receiver system is obtained as follows.

$$NF'_{total} \approx L_b + NF_1 = 1+1 = 2 \text{ dB}$$

From the above expression, it can be seen that the total reception noise figure of the receiver system is improved or lowered by the amount of insertion loss of the coaxial cable (≈4 dB) because the coaxial cable is not included in the receiver system any more.

Although the idea on the improvement of the reception sensitivity with the consequence of the extension of the maximal communication distance for the up-link is well-known to those skilled in the art, the receiver system of the mobile communication base station lies in real situation of being established indoors other than outdoors because of the difficulty of implementing the idea in reality.

In addition, when the receiver system is established outdoors, however, there is a problem that the characteristics of the receiver system is changed with the change of external environment.

More specifically, firstly, as temperature is changed, the characteristics of the bandpass filter (or duplexer filter) is changed. In other words, if the receiver system is established outdoors, the temperature environment of the receiver system is changed in the range from about −30° C. to about 80° C. to thereby change the frequency characteristics of the bandpass filter by the order of several MHz resulting in the occurrence of communication jamming.

Also, the characteristics of the low noise amplifier (or including down-converter) is significantly changed with the rising of temperature. Consequently, the gain of the low noise amplifier grows reduced and the noise figure of the same grows increased.

In order to prevent the deterioration of characteristics of the outdoor receiver system caused by such a temperature change, the outdoor receiver system should be placed in a thermostat.

In keeping the temperature of the thermostat constant, a low ambient temperature does not matter particularly because the temperature of the thermostat can be raised by a heater provided therein. However, if an ambient temperature is high, an air conditioner should be provided within the thermostat. However, considering the existing state of the art, it is not easy to establish, maintain and repair the outdoor receiver system in which the air conditioner is employed because of an excess of volume and weight of, for example, a condenser fan as a part of the air conditioner.

The maintenance and repair include the periodic supplement of a refrigerant and the settlement of mechanical trouble of such rotating portion as the condenser fan. As a result, weak durability and mechanical shaking of the air conditioner are apt to have a bad influence upon the characteristics of the receiver system.

On the other hand, the receiver system has been known which keeps the temperature of the bandpass filter made into high temperature superconducting material constant to about 77° K. in absolute temperature by using liquid nitrogen to prevent the deterioration of the characteristics of the outdoor receiver system caused by the change of temperature. However, since a compressor should be employed in this receiver system to provide liquid nitrogen, this receiver system has no practical use owing to the difficulty of establishing, maintaining and repairing the compressor as well as the cost of it.

Therefore, there is a need for an improved thermostat which has light weight and small volume, facilitates the maintenance and repair, and has excellent durability and high reliability in order to prevent the deterioration of characteristics from generating when the receiver system in the mobile communication base station is established outdoors.

SUMMARY OF THE INVENTION

In consideration of the above problems, an object of the present invention is to provide an outdoor receiver system in a mobile communication base station which is established outdoors and is capable of increasing a maximal communication distance for an up-link by use of a thermal electric module.

Another object of the present invention is to provide an outdoor receiver system in a mobile communication base station which has small volume and light weight, facilitates the maintenance and repair, and has excellent durability and high reliability by using a thermal electric module in order to keep temperature of the outdoor receiver system constant.

Still another object of the present invention is to provide an outdoor receiver system in a mobile communication base station which is applied with direct voltage from an indoor direct power supply comprising a battery backup device and is implemented as a distribution type to prevent disability of the receiver system due to an electricity failure and so on.

Still another object of the present invention is to provide an outdoor receiver system in a mobile communication base station which facilitates test for intensities of signals received in the outdoor receiver system and check for operation state of the outdoor receiver system by using a dual directional coupler and, when a state monitor for monitoring the state of the outdoor receiver system is provided indoors, prevents the change of characteristics of the receiver system caused by the increase of the number of cable by use of a splitter for communicating the outdoor receiver system with a state matching unit provided indoors.

For the purpose of accomplishing the above objects, in accordance with an aspect of this invention, the outdoor receiver system in a mobile communication base station comprises a container being separable into two and having connectors on the sides of the container and heat radiating plates on the upper and lower sides of the container, a receiving portion connected with a coaxial cable penetrating the connectors and including a bandpass filter for passing through only a desired frequency band of an input signal, a metal plate provided at the bottom of the receiving portion for increasing thermal conduction, a thermal electric module connected to the metal plate for operating as a heating mode or a cooling mode according to the change of direction of the direct current, a controlling portion for controlling the operation of the thermal electric module according to the change of temperature of the receiving portion, a power supplying portion for converting an alternating current into a direct current and then applying it to the receiver system, and adiabatic material filled in empty space inside the container to reduce an effect on the receiver system by the change in ambient temperature.

Preferably, the controlling portion comprises a temperature sensor mounted on the bandpass filter and the low noise amplifier of the receiving portion or the metal plate for generating an output determined by a thermistor whose resistance is changed with the change in temperature of the receiving portion or the metal plate and resistors to determine the range of the operation temperature of the thermal electric module, inverting/noninverting TTL drivers for inverting/noninverting the output of the temperature sensor to a TTL level, and a thermal electric module driving portion for controlling the operation mode of the thermal electric module to be heating/cooling/stop mode by applying/blocking a direct current to the thermal electric module with the outputs of the inverting/noninverting TTL driver. These and other features of the invention are discussed in greater detail below in the following detailed description of the presently preferred embodiments with reference to the accompanying drawings.

DETAILED DESCRIPTION OF THE PREFERRED EMBODIMENTS OF THE INVENTION

The present invention will now be described in detail by way of preferred embodiments with reference to the accompanying drawings.

Figure 1:
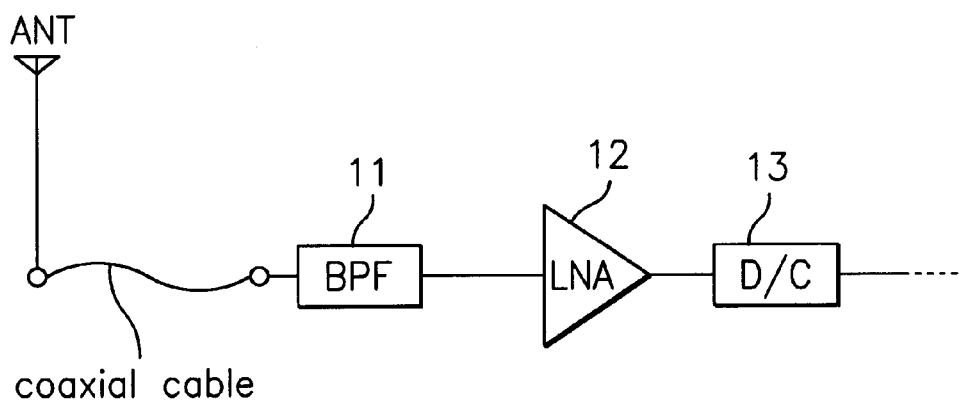
FIG. 1 is a schematic block diagram of a conventional indoor receiver system in a base station.
Figure 2:
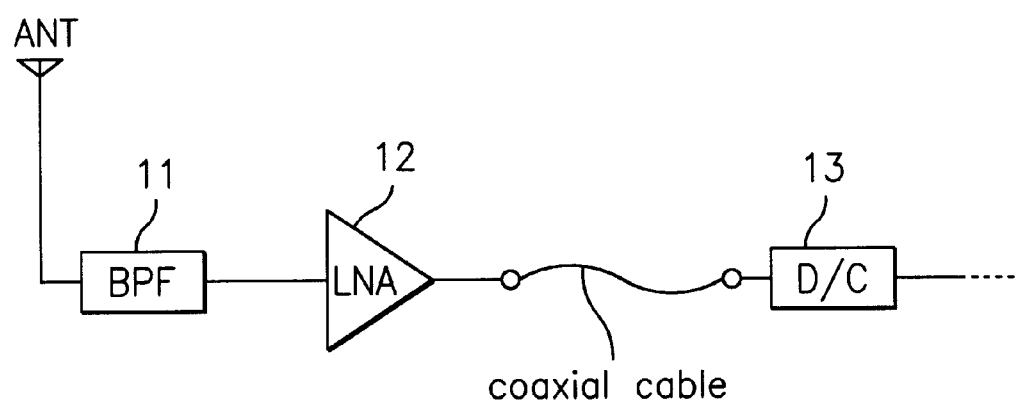
FIG. 2 is a schematic block diagram of an outdoor receiver system in a base station.
Figure 3:
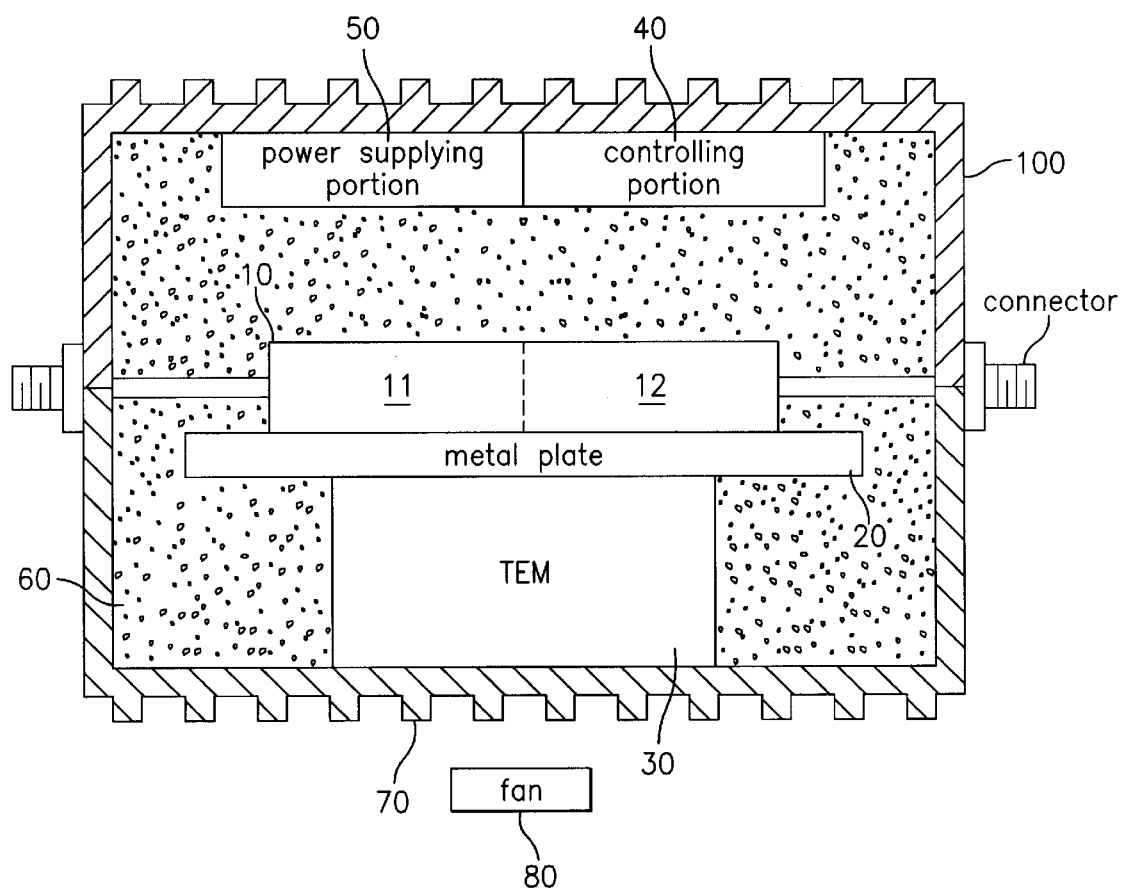
FIG. 3 is a cross-sectional view of an outdoor receiver system according to an embodiment of the present invention.

FIG. 3 shows a cross-sectional view of an outdoor receiver system according to an embodiment of the present invention. Referring to the figure, an outdoor receiver system in a mobile communication base station comprises a container 100 being separable into two and having connectors on the sides of the base station comprises a container 100 being separable into two and having connectors on the sides of the container and heat radiating plates 70 on the upper and lower sides of the container, a receiving portion 10 connected with a coaxial cable penetrating the connectors and including a bandpass filter 11 for passing through only a desired frequency band of an input signal and a low noise amplifier for amplifying an output signal from said bandpass filter, a metal plate 20 provided at the bottom of the receiving portion 10 for increasing thermal conduction, a thermal electric module 30 connected to the metal plate 20 for operating as a heating mode or a cooling mode according to the change of direction of the direct current, a controlling portion 40 for controlling the operation of the thermal electric module 30 according to the change of temperature of the receiving portion 10, a power supplying portion 50 for converting an alternating current into a direct current and then applying it to the receiver system, and adiabatic material 60 filled in empty space inside the container 100 to reduce an effect on the receiver system by the change in ambient temperature.

Figure 6A:
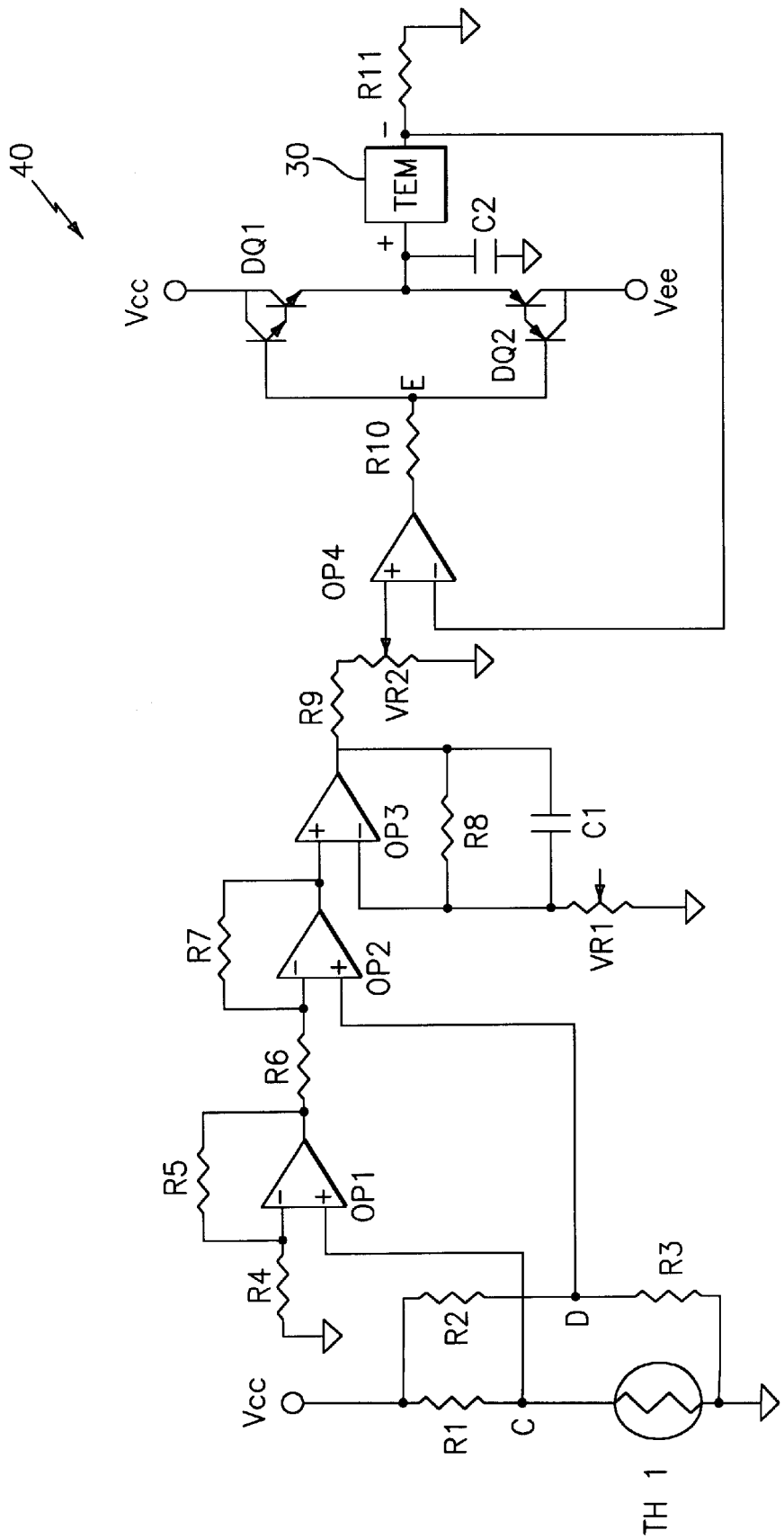
FIGS. 6a and 6b are exemplary circuit diagrams of a controlling portion for controlling a thermal electric module, according to the present invention.
Figure 6B:
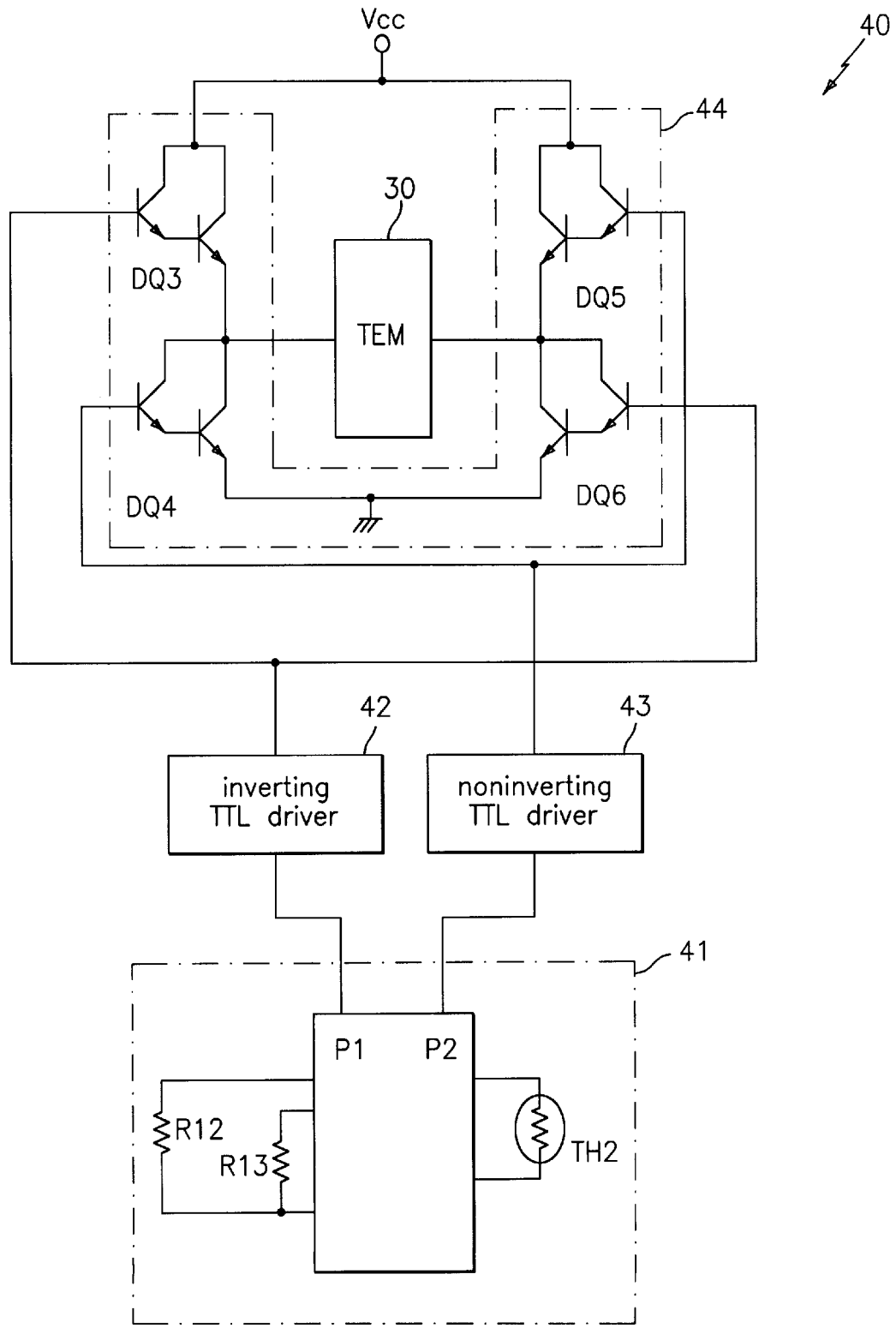

Furthermore, as shown in FIG. 6b which will be described in detail below, the controlling portion 40 comprises a temperature sensor 41 mounted on the bandpass filter 11 and the low noise amplifier 12 of the receiving portion 10 or the metal plate 20 for generating an output determined by a thermistor TH2 whose resistance is changed with the change in temperature of the receiving portion 10 or the metal plate 20 and resistors R12, R13 to determine the range of the operation temperature of the thermal electric module 30, inverting/noninverting TTL driver 42, 43 for inverting/noninverting the output of the temperature sensor 41 to a TTL level, and a thermal electric module driving portion 44 for controlling the operation mode of the thermal electric module 30 to be heating/cooling/stop modes by applying/blocking a direct current to the thermal electric module 30 with the outputs of the inverting/noninverting TTL driver 42, 43.

At this time, a down-converter 13 for converting a RF signal of the low noise amplifier 12 into a signal with intermediate frequency band is established indoors and connected to the receiver system through the coaxial cable. Also, a fan 80 for causing a forced convection current can be provided outside the receiver system for effective and fast heat radiation of the receiver system.

Figure 4A:
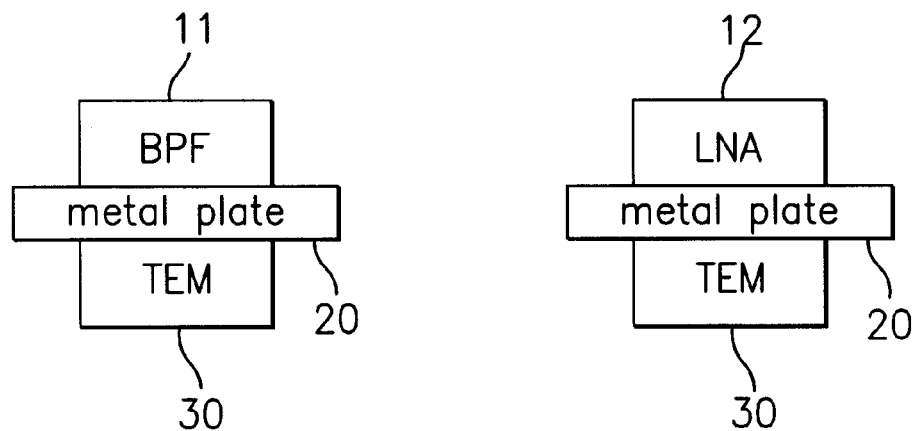
FIGS. 4a to 4d illustrate examples of combination of a receiving portion, a metal plate, and a thermal electric module in the receiver system of FIG. 3.

Referring to FIG. 4a to 4d, FIG. 4a to 4d show examples of combination of the receiving portion, the metal plate, and the thermal electric module in the receiver system of FIG. 3. As shown in FIG. 4a, the receiver system can be configured to combine the metal plate 20 and the thermal electric module 30 with the bandpass filter 11 and the low noise amplifier 12, respectively, of the receiving portion 10 within the container 100.

Figure 4B:
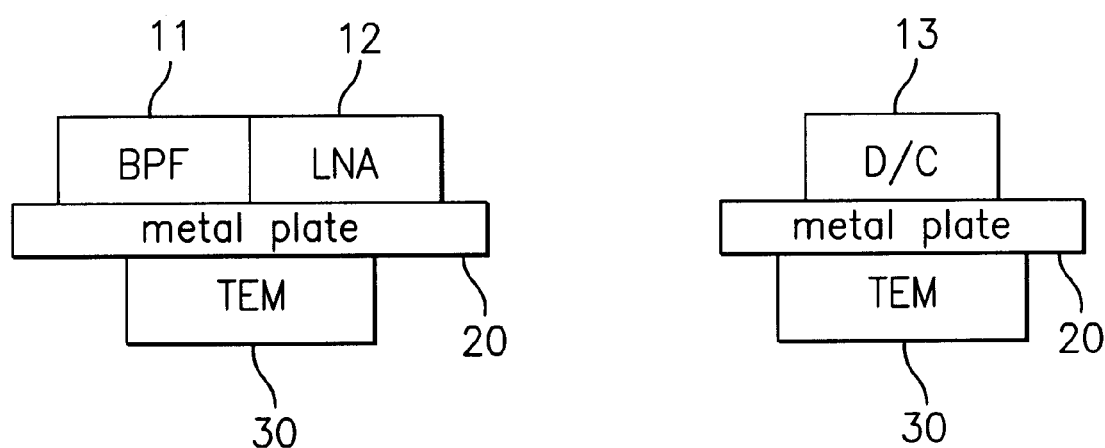

In addition, as shown in FIG. 4b, the receiver system can be configured to further include the down-converter 13 combined with the metal plate 20 and the thermal electric module 30 within the container 100.

Figure 4C:
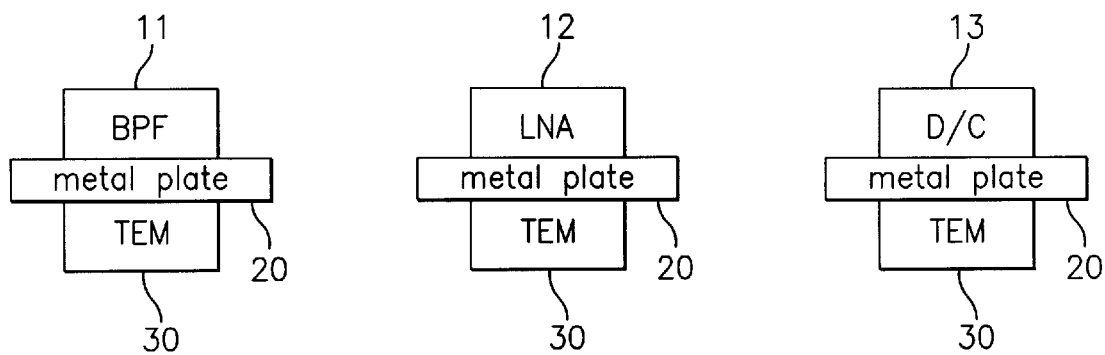

In addition, as shown in FIG. 4c, the receiver system can be configured to combine the metal plate 20 and the thermal electric module 30 with the bandpass filter 11, the low noise amplifier 12, and the down-converter 13, respectively, within the container 100.

In addition, the receiver system can be configured to provide each device mounted on the upper portions of the metal plates 20 and the thermal electric modules 30 as shown in FIGS. 4a to 4c, including the power supply portion 50 and the controlling portion 40, within the respective container 100.

Figure 4D:
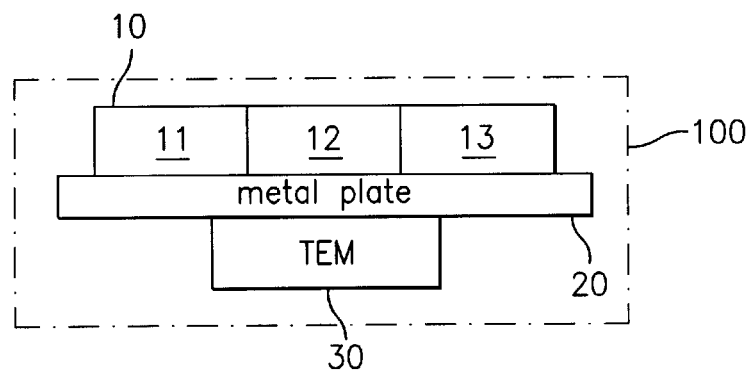

In addition, as shown in FIG. 4d, the receiver system can be configured to add the down-converter 13 to the receiving portion 10 within the container.

In addition, a duplexer filter (not shown) can be used in place of the bandpass filter 11.

The oudoor receiver system can use an appropriate number of the thermal electric module 30 as occasion demands and an appropriate number of the receiver system can be implemented as a concentration type or a distribution type.

Figure 7:
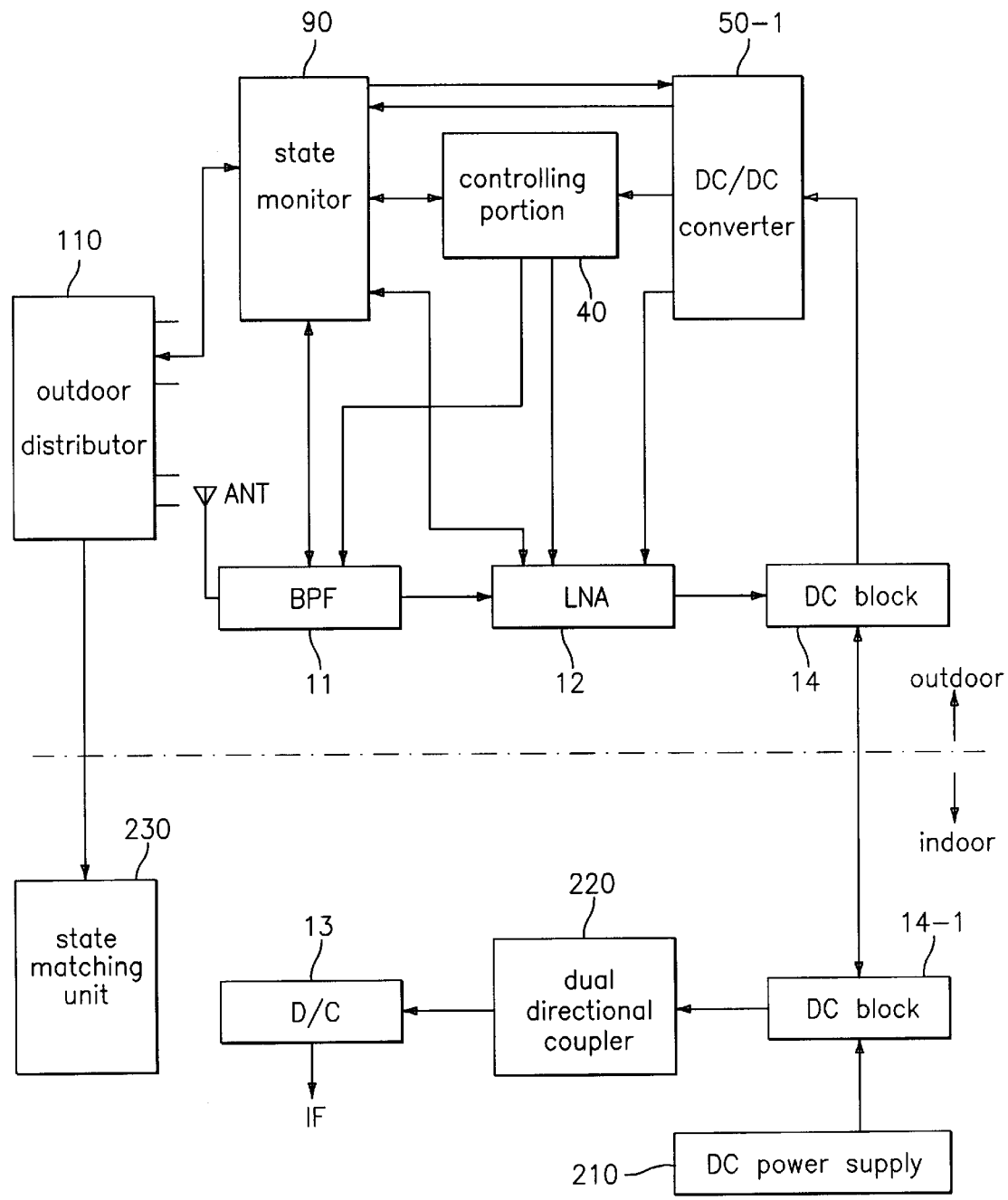
FIG. 7 is a schematic block diagram of an outdoor receiver system implemented as a distribution type, according to another embodiment of the present invention.

FIG. 7 shows a schematic block diagram of the outdoor receiver system implemented as a distribution type according to another embodiment of the present invention. This outdoor receiver system of the distribution type is applied with a direct current via a high frequency coaxial cable from an indoor direct current power supply 210 comprising a battery backup device to prevent disability of the receiver system due to an electricity failure and so on.

Referring to FIG. 7, the outdoor receiver system of the distribution type will be discussed in detail hereafter.

As shown in FIG. 7, the outdoor receiver system of the distribution type further includes a DC/DC converter 50-1 for converting power supplied from an indoor direct power supply 210 comprising a battery backup device in place of the power supplying portion 50 into direct power to be used in the receiver system and a direct current block 14 connected between the DC/DC converter 50-1 and the low noise amplifier 12 for combining or separating the direct power and a RF signal. Another direct current block 14-1 is provided between the indoor direct power supply 210 and the down-converter 13. Two direct current blocks described above are connected each other through the high frequency coaxial cable.

Also, the direct current blocks 14, 14-1 can further include a surge arrestor (SA) respectively to secure the receiver system against thunderbolt or abnormal high voltage inducible and the outdoor direct current block 14 in the receiver system can be configured to be an integral form with the low noise amplifier 12.

Furthermore, the receiver system can further include a dual directional coupler 220 between the indoor direct current block 14-1 and the down-converter 13 so that the intensity of a received signal and the operation state of the receiver system may be checked from inside.

In addition, when a state monitor 90 is provided in the outdoor receiver system of the distribution type to monitor the outdoor receiver system, an outdoor splitter 110 can be further included to prevent a connection fault caused by the increase in length and number of the coaxial cable at the time of connecting the state monitor 90 with an indoor state matching unit 230 and find the reason of an arisen trouble with ease.

Figure 11:
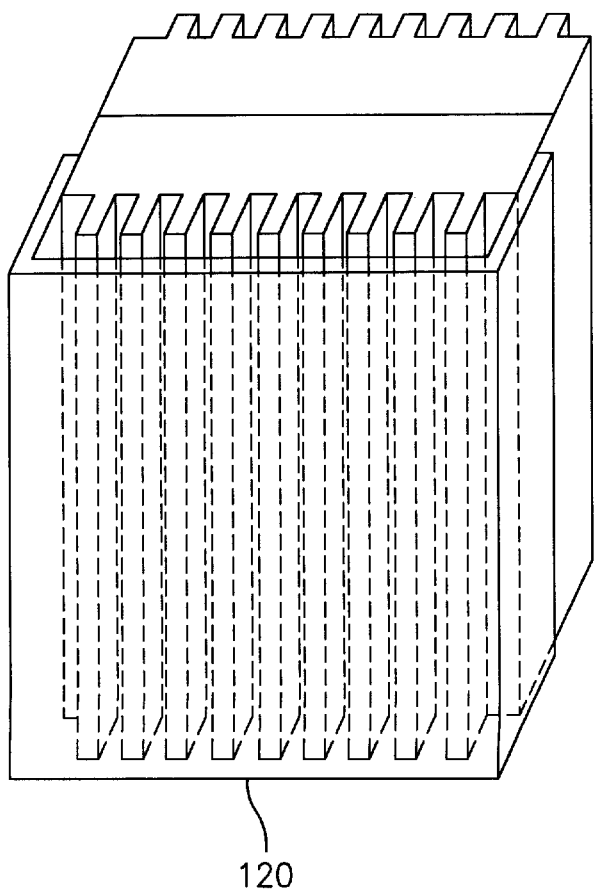
FIG. 11 is a perspective view of an outdoor receiver system provided with a blind.

In addition, as shown in FIG. 11, in the outdoor receiver system of the distribution type, a blind 120 can be attached at a certain interval with the heat radiating plate 70 to protect the outdoor receiver system against direct lays of the sun and radiate effectively heat inside the container 100 through the heat radiating plate 70.

So far, the outdoor receiver system according to the present invention has been discussed with respect to its structure.

Now, the outdoor receiver system according to the present invention will be described with respect to its operation.

Referring again to FIG. 3 showing the outdoor receiver system according to an embodiment of the present invention, the outdoor receiver system uses alternating power supplied from outside and the power supplying portion 50 converts this alternating power into direct power to operate the receiver system.

In implementing the thermostat, a thermal electric module 30 with small volume, light weight, high reliability, and excellent durability is used without a need of using a refrigerant and such a mechanical driving portion as a condenser fan.

The thermal electric module 30 has a structure that p-type and n-type semiconductors are inserted between two ceramic plates, as shown in FIG. 5. This structure can be obtain Peltier effect by flowing current between p-type and n-type semiconductors, paying attention to the discovery by Jean Peltier in the 1800's that heating and cooling effects are produced when current flows through two different kind of metal, and has been known to have high efficiency.

Also, the thermal electric module 30 is formed to be electrically in series and thermodynamically in parallel and one side of the thermal electric module 30 can be changed from a cooling mode to a heating mode (or vice versa) by changing the direction of current by use of a direct power source.

The operation of the thermal electric module 30 will be more concretely explained in connection with FIG. 5a and 5b as follows.

Figure 5A:
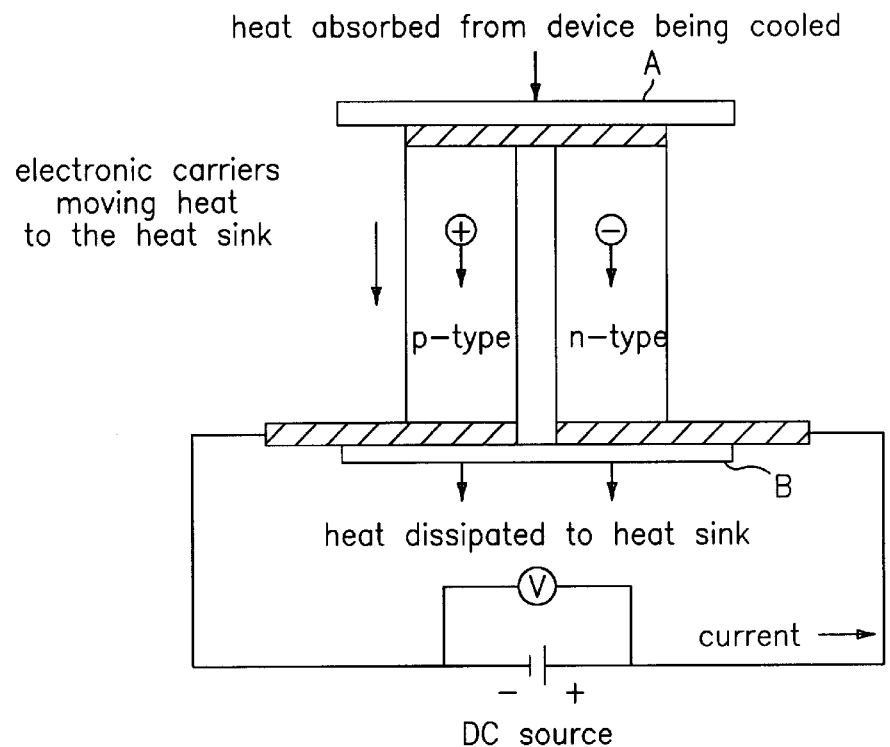
FIG. 5a illustrates a thermal electric module operating in a cooling mode, according to the present invention.
Figure 5B:
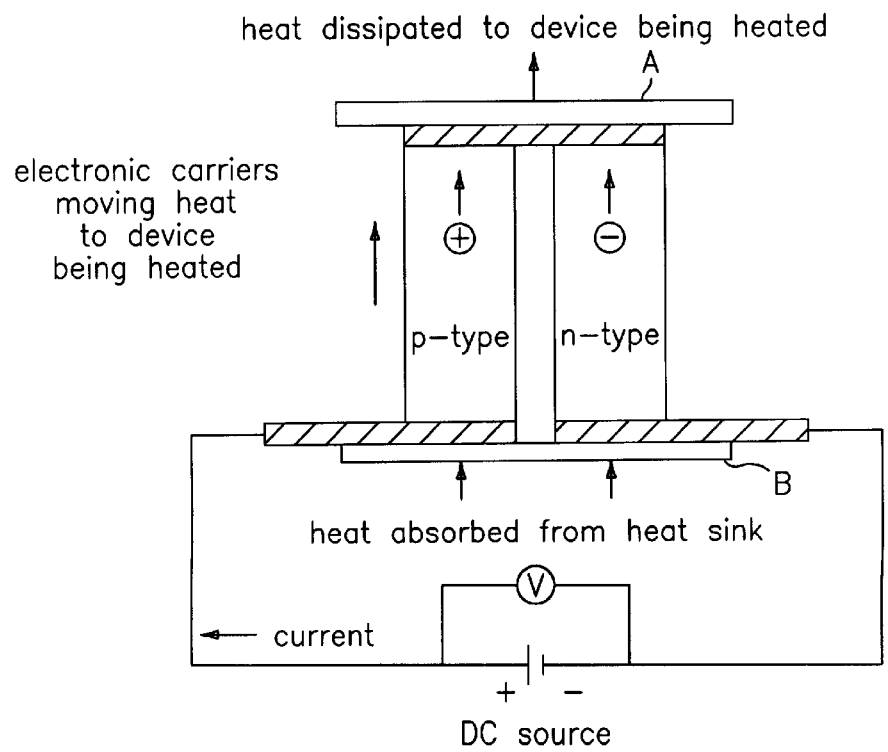
FIG. 5b illustrates a thermal electric module operating in a heating mode, according to the present invention.

FIG. 5a shows the thermal electric module 30 operating in the cooling mode and FIG. 5b shows the thermal electric module 30 operating in the heating mode.

First, the thermal electric module 30 operating in the cooling mode will be described. As shown in FIG. 5a, when (+) polarity of the direct power source is connected to a n-type semiconductor and (−) polarity of that is connected to a p-type semiconductor, electron moves from the p-type semiconductor to (+) polarity of the direct power source via the upper plate A of the thermal electric module and then the n-type semiconductor. At this time, the upper plate A of the thermal electric module absorbs heat. As a result, each device (i. e, BPF 11 and LNA 12 and so on of FIG. 3) mounted on the upper plate A is deprived of its heat to be cooled. The thus absorbed heat is radiated through the lower plate B and then the heat radiating plate (70 of FIG. 3) attached to the bottom of the thermal electric module. On the other hand, as shown in FIG. 5b, in the thermal electric module 30 operating in the heating mode, (+) polarity of the direct power source is connected to the p-type semiconductor and (−) polarity of that is connected to the n-type semiconductor. Accordingly, as the direction of current is reversed, the upper plate A of the thermal electric module is heated and the lower plate B of that is cooled.

For the application of the thermal electric module 30 operating as described above to the outdoor receiver system in a mobile communication base station, a controlling portion 40 for controlling the thermal electric module 30 to keep the temperature of the receiver system constant is required.

FIG. 6a shows one example of the controlling portion 40 to control the thermal electric module 30. Referring to FIG. 6a, control operation of the thermal electric module 30 by way of the controlling portion 40 will be explained as follows:

When the operation temperature (for example, $25^{540}$ Y) of the thermal electric module 30 is set by the thermistor TH1 mounted on the receiving portion 10 or the metal plate 20, if the internal temperature of the receiving portion 10 is raised, resistance of the thermistor TH1 is decreased and then balance of a bridge circuit comprising the thermistor TH1 and resistors R2, R3 is lost. Accordingly, as potential at point C is different from potential at point D, potential at point E through operational amplifiers OP1~OP4 becomes positive (+). Therefore, one Darlington transistor DQ1 turns on and another Darlington transistor DQ2 turns off. Then, positive (+) voltage is applied to the thermal electric module 30 to thereby operate the thermal electric module 30 in the cooling mode. As a result, temperature of the receiving portion 10 is lowered by absorbing heat of the receiving portion 10 in the metal plate 20 mounted on the thermal electric module 30 and then radiating through the heat radiating plate 70.

When the internal temperature of the receiving portion 10 is lower than the set temperature (for example, 25° C.), resistance of the thermistor TH1 is increased and then balance of the bridge circuit is lost. Accordingly, as potential at point C is different from potential at point D, potential at point E through operational amplifiers OP1~OP4 become negative (−). Therefore, one Darlington transistor DQ1 turns off and another Darlington transistor DQ2 turns on. Then, negative (−) voltage is applied to the thermal electric module 30 to thereby operate the thermal electric module 30 in the heating mode. As a result, temperature of the receiving portion 10 is raised as the receiving portion 10 is heated through the metal plate 20 mounted on the thermal electric module 30.

As described above, as temperature of the receiving portion 10 is changed, the thermistor TH1 of the controlling portion 40 is changed in its resistance and then the direction of the direct current applied to the thermal electric module 30 is changed. In accordance with this change, temperature around the set temperature can be maintained as the thermal electric module 30 operates as the cooling/heating modes. It should be noted that the operation as described above was described for the thermistor TH1 with negative characteristic but the thermistor TH1 with positive characteristic operates opposite to that with negative characteristic.

However, in the above description, as temperature become slightly higher or lower than the preset temperature by an offset in the vicinity of the preset temperature, the operation mode of the thermal electric module 30 is frequently changed. In other words, a thermal cycling can occur. Accordingly, the thermal electric module 30 changes frequently from cold state to hot state or vice versa, resulting in the reduction of life span of the thermal electric module 30.

In consideration of this point, FIG. 6b illustrates another controlling portion of the thermal electric module which is adapted to reinforce a weak point of FIG. 6a, according to the present invention.

Referring to FIG. 6b, this controlling portion 40 use a digital circuit and temperature of the receiving portion 40 is set with not one kind but a range of an upper limit to a lower limit. If temperature of the receiving portion is out of this range, Darlington transistors DQ3~DQ6 of a thermal electric module driving portion 44 turn on selectively so that the direct current can be applied to the thermal electric module 30 to operate it as either the cooling mode or the heating mode. Otherwise, when temperature of the receiving portion is in this range, all of Darlington transistors DQ3~DQ6 turn off so that no direct current is applied to the thermal electric module 30 to stop the operation of the thermal electric module 30. Accordingly, as a thermal shock caused by frequent change of the operation mode can be alleviated, the life span of the thermal electric module 30 is prolonged. Also, as the consumption of power can be reduced, the output of the direct power supply for operating the thermal electric module 30 can be reduced. Further, as a load can be reduced, an average current capacity is reduced resulting in the extension of life span of the power supply portion 50.

Now, a control procedure of the controlling portion 40 of FIG. 6b for the thermal electric module 30 will be explained in detail.

For example, if values of resistors R12 and R13 is set so that each device of the receiving portion 10 is maintained within a constant temperature range (for example, 15° C.~30° C.), a temperature sensor 41 detects resistance value of the thermistor TH2 mounted on the receiving portion 10 or the metal plate 20 and compares the temperature corresponding to the detected resistance value with the temperature range preset by the resistors R12 and R13. When the temperature corresponding to the detected resistance value is in the preset temperature range, a port 1(P1) is "high" and a port 2(P2) is low. Accordingly, both of inverting/noninverting TTL drivers 42 and 43 output "low" signal to the thermal electric module driving portion 44 to thereby make all of the Darlington transistors DQ3~DQ6 "off".

Therefore, as no direct current is applied to the thermal electric module 30, the thermal electric module 30 becomes a stop mode which operates as neither the heating mode nor the cooling mode.

When the temperature of the receiving portion 10 is raised by the change of the external or internal environment, the resistance value of the thermistor TH2 is lowered. The temperature sensor 41 compares the temperature corresponding to this resistance value with the preset temperature range (for example, 15° C.~30° C.). If a preset upper limit (for example, 30° C.) is exceeded, a port1 (P1) and a port 2 (P2) is all "low". Accordingly, the output of the inverting TTL driver 42 is "high" to thereby make Darlington transistors DQ3 and DQ6 "on" and the output of the noninverting TTL driver 43 is "low" to thereby make Darlington transistors DQ4 and DQ5 "off" so that the raised temperature may be lowered by operating the thermal electric module 30 as the cooling mode.

When the temperature of the receiving portion 10 is lowered, the resistance value of the thermistor TH2 is raised. The temperature sensor 41 detects this resistance value and compares the temperature corresponding to this detected resistance value with the preset temperature range (for example, 15° C.~30° C.). If the temperature corresponding to the resistance value is in the preset temperature range, as described above, the thermal electric module 30 becomes a stop mode which operates as neither the heating mode nor the cooling mode.

When the temperature of the receiving portion 10 continues to raise, the resistance value of the thermistor TH2 is more raised. The temperature sensor 41 detects this resistance value and compares the temperature corresponding to this detected resistance value with the preset temperature range. If the temperature corresponding to the resistance value is lower than the lower limit (for example, 15° C.) of the preset temperature range, both of a port 1 (P1) and a port 2 (P2) output "high". Accordingly, the output of the inverting TTL driver 42 is "low" to thereby make Darlington transistors DQ3 and DQ6 "off" and the output of the noninverting TTL driver 43 is "high" to thereby make Darlington transistors DQ4 and DQ5 "on" so that the lowered temperature may be raised by operating the thermal electric module 30 as the heating mode.

So far, the thermistor TH2 with negative characteristic has been described. If the thermistor TH2 with positive characteristic be used, the operation of the thermal electric module 30 can be controlled in the same manner with the above description by connecting the output of the port 1 (P1) of the temperature sensor 41 to the noninverting TTL driver 43 and the output of the port 2 (P2) of the temperature sensor 41 to the inverting TTL driver 42.

As described above, the receiving system can operate under a constant temperature by operating the thermal electric module 30 as one of heating/cooling/stop modes by the control of the controlling portion 40 according to the change of temperature of the receiving portion 10.

At this time, heat of the receiver system can be radiated more effectively and fast by using an external fan 80.

Next, referring to FIG. 7, FIG. 7 shows a schematic block diagram of an outdoor receiver system implemented as a distribution type according to another embodiment of the present invention.

In general, the receiver system in the mobile communication base station divides a receivable region into 3 areas i.e, 3 sectors, each having two receiving portions, by 120 degrees and takes the strongest signal of received signal in each receiving portion. This is because a multipath fading due to an external environment exists in a path extending from a terminal (a mobile station) for the mobile communication to a base station.

Figure 12:
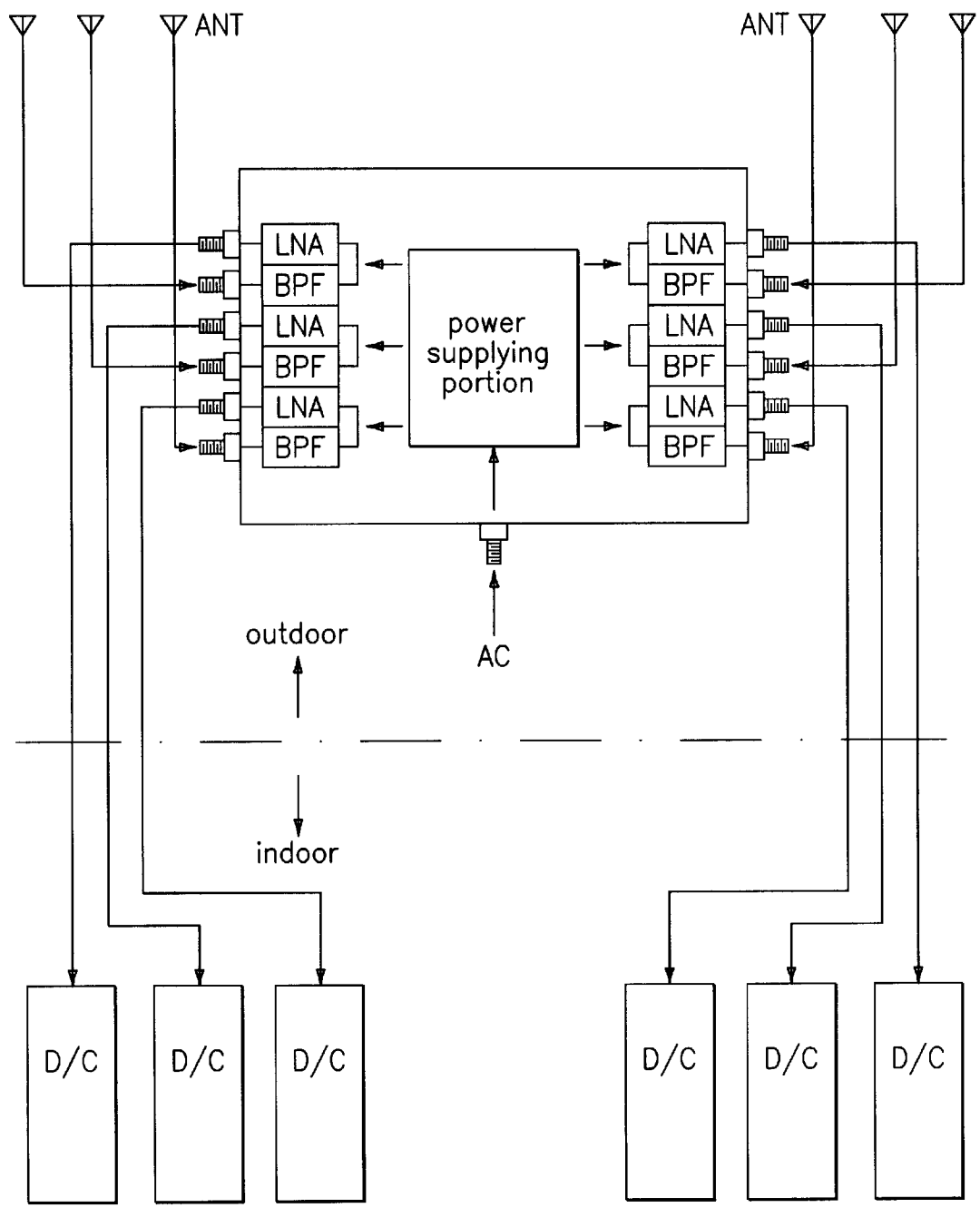
FIG. 12 is an exemplary view of a concentration type of an outdoor receiver system.
Figure 13:
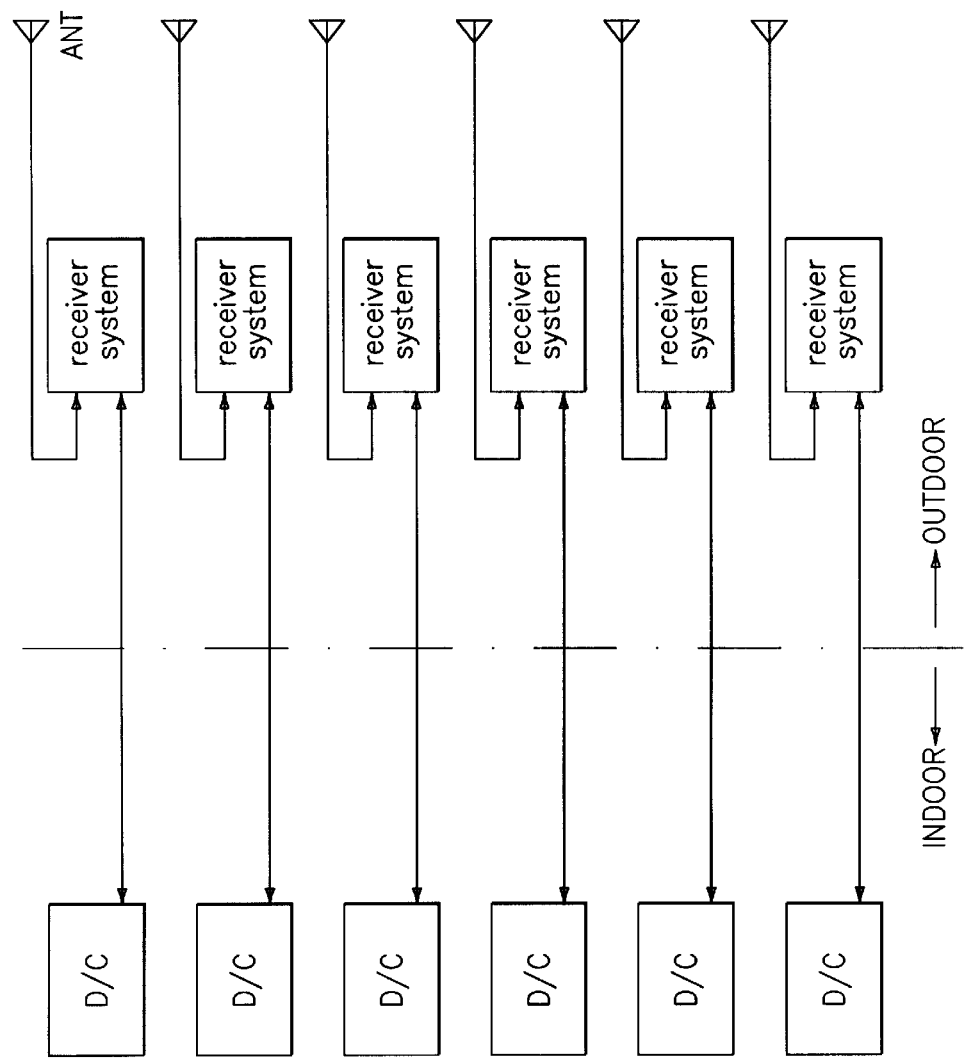
FIG. 13 is an exemplary view of a distribution type of an outdoor receiver system.

In the receiver system with the receivable region divided into 3 sectors to receive signals of the mobile communication, there are six receiving portions 10 each comprising the bandpass filter 11 and the low noise amplifier 12. The outdoor receiver system in which all of the six receiving portions are established within one container 100 is referred as a concentration type, as shown in FIG. 12. On the other hand, the outdoor receiver system in which each of the six receiving portions is established within the respective containers 100 is referred as a distribution type as shown in FIG. 13.

However, since each receiving portion 10 of the outdoor receiver system implemented as the concentration type uses commercial alternating powers with the same power source, when abnormality (for example, electricity failure or disorder of a power supply) of the power supply occurs, the entire receiver system loses its ability, resulting in the discontinuance of the communication service.

Although power may be applied from the outdoor direct power supply 210 to the receiving portion, since the outdoor receiver system implemented as the concentration type requires a plurality of thermal electric module 30 to keep the temperature of each receiving portion 10 constantly, the consumption current of the thermal electric modules becomes large current with the range of several amperes to several ten amperes to make the use of the indoor direct power supply 210 impossible.

Therefore, this invention distributes the outdoor receiver system to accommodate one receiving portion or one receiving portion sector within the container 100 and implements the outdoor receiver system as the distribution type to be applied with power from the indoor direct power supply 210 comprising the battery backup device.

Now, the outdoor receiver system implemented as the distribution type will be more explained with reference to FIG. 7.

The outdoor receiver system of the distribution type uses the DC/DC converter 50-1 for converting the power applied from the indoor direct power supply 210 into the direct power to be used in the receiver system in place of the outdoor receiver system as shown in FIG. 3 and uses the high frequency coaxial cable connecting the low noise amplifier 12 with the indoor down-converter 13 without using a separate power cable to apply power from the indoor to the outdoor receiver system.

At this time, the direct current block 14, 14-1 can be used in both of the indoor and the outdoor to prevent the low noise amplifier 12 and the down-converter 13 from being influenced by the direct current.

Figure 8:
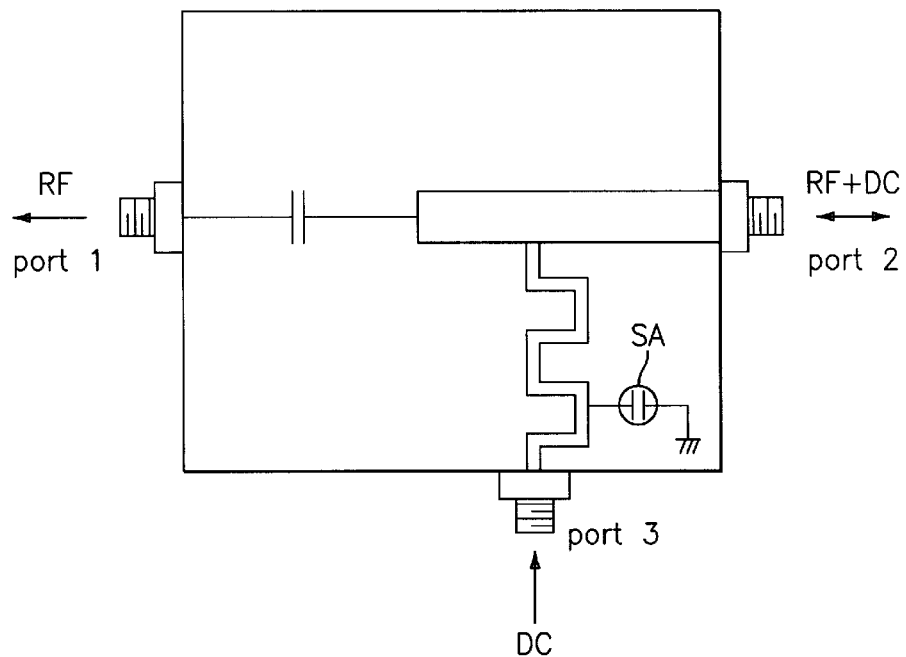
FIG. 8 is a schematic diagram of a direct current block in FIG. 7 including a surge arrestor.

The direct current block 14, 14-1 of the present invention comprises 3 ports and includes a surge arrestor SA, as shown in FIG. 8. Of the 3 ports, a port 1 passes through only RF signal but blocks the direct current, a port 2 is a port coupling the direct current with the RF signal, and a port 3 passes through only the direct current but blocks the RF signal. Also, the surge arrestor SA protects the receiver system against thunderbolt or abnormal high voltage inducible.

The port 1 of the indoor direct current block 14-1 is connected with the down-converter 13 or, if included, the dual directional coupler 220, the port 2 is connected with the high frequency coaxial cable, and the port 3 is connected with the direct power supply 210.

Accordingly, the direct power is applied to the outdoor receiver system through the high frequency coaxial cable while preventing the down-converter 13 or, if included, the dual directional coupler 220 from being influenced by the direct power applied from the direct power supply 210.

On the other hand, the direct current block 14 of the outdoor receiver system has a port 1 connected to the low noise amplifier 12, a port 2 connected to the high frequency coaxial cable, and a port 3 connected to the DC/DC converter 50-1.

Accordingly, the low noise amplifier 12 amplifies only RF signal received through the bandpass filter 11 without being influenced by the direct current and transmits the amplified RF signal to the down-converter 13 or, if included, the dual directional coupler 220 through the high frequency coaxial cable. Also, the direct power applied from the indoor though the high frequency coaxial cable of the port 2 is separated in the direct current block 14 and provided to the DC/DC converter 50-1 through the port 3.

At this time, however, since the direct current block 14 of the outdoor receiver system is typically connected by a cable between the low noise amplifier 12 and an external connector of the container 100, the change in characteristic of the cable, a wrong action, and the difficulty of management can be expected.

Figure 9:
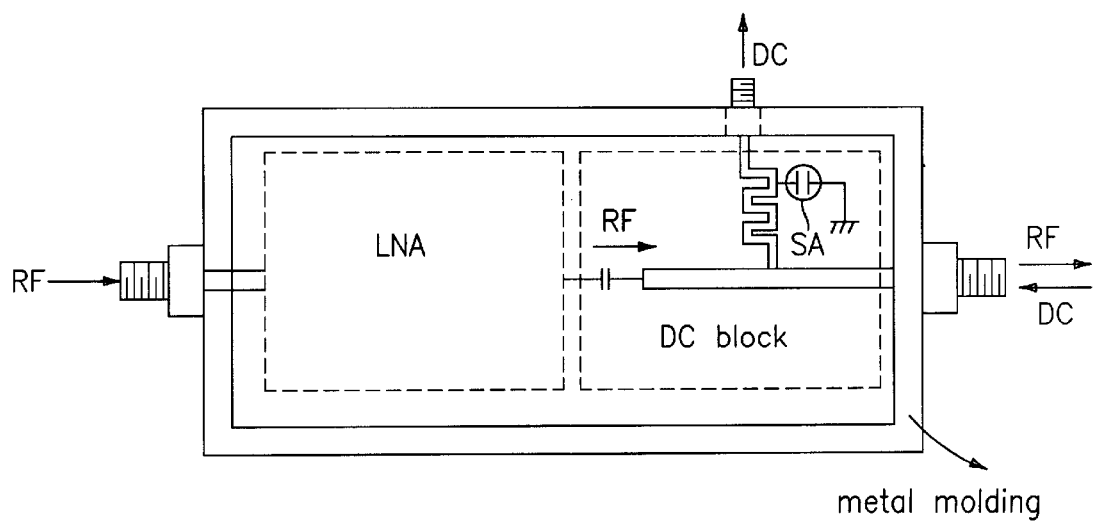
FIG. 9 is a schematic diagram showing the integration of a low noise amplifier with a direct current block.

In order to prevent these, the direct current block 14 including the low noise amplifier 12 and the surge arrestor SA is configured to be an integral form to reduce the number of the cable in the receiver system, as shown in FIG. 9.

The surge arrestor SA protects the receiver system against thunderbolt or abnormal high voltage inducible.

In general, it is necessary to have a test terminal in order to check the intensity of the signal received in the outdoor receiver system and the operation state of the outdoor receive system. However, this invention uses the dual directional coupler 220 to solve the difficulty of checking at a tower in case where the test terminal is provided in the outdoor receiver system.

Figure 10:
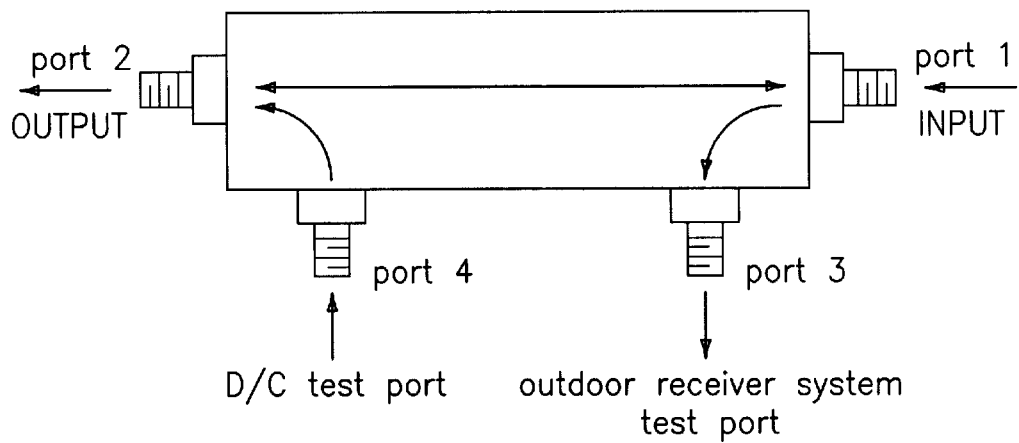
FIG. 10 is a schematic diagram of a dual directional coupler in FIG. 7.

The dual directional coupler 220 comprises 4 ports and is established between the down-converter 13 and the direct current block 14-1, as shown in FIG. 10.

Of the 4 ports, a port 1 is an input port at which a RF signal amplified in the low noise amplifier 12 via the bandpass filter 11 is inputted through the high frequency coaxial cable and the direct current block 14-1, a port 2 is an output port of the RF signal, a port 3 is a state test port of the intensity of the received signal and the operation state of the receiver system, and a port 4 is a isolated port by which the signal with the same frequency for test as the frequency of the received signal is applied to the down-converter 13 through the dual directional coupler 220 and the level of the intermediate frequency is measured at an output port of the down-converter 13 to make the test for the operation state of the down-converter 13 possible.

Next, an outdoor distributor 110 used in this invention will be described below:

In general, the mobile communication base station receives signals in 3 sectors divided and each sector uses two receiver system due to a space diversity.

However, in such an outdoor receiver system, when a state monitor 90 is provided in the receiver system in order to inform the operation state and warning of the receiver system, more than 6 coaxial cable for the communication are required to connect the state monitor 90 with a state matching unit 230 established at the indoor. This causes the increase of the number of the cable. This increase of the number of the cable results in the increase of cost and makes the use of the receiver system difficult due to a cable wiring error.

Therefore, with the present invention, by connecting N inputs from the state monitor 90 provided in the receiver system to the state matching unit 230 through one coaxial cable by means of the outdoor distributor 110 to thereby reduce the number and length of the entire cable for more simple wiring, the problem caused by the increase of the number of the cable can be solved and, at the same time, the reason of an arisen trouble can be grasped quickly.

Last, the description about a blind 120 used in the present invention will be given below.

When the internal temperature of the container 100 in the outdoor receiver system is raised, the thermal electric module 30 operates as the cooling mode to radiate heat through the radiating plate for the maintenance of constant temperature, thereby increasing the external temperature of the container. At this time, when a direct sunlight is strong, the efficiency of the thermal electric module 30 is decreased to thereby make it difficult to keep the internal temperature of the container constant.

Accordingly, a blind 120 is provided at regular intervals with the heat radiating plate 70 of the receiver system in order to prevent the deterioration of efficiency of the thermal electric module 30, as shown in FIG. 11.

Thus, convection current phenomenon that hot air moves from low place to high place due to a so called chimney effect is so animated that radiation of heat of the radiating plate becomes more effective. As a result, the container is protected against direct sunlight and, at the same time, the internal of the container is not influenced by heat from the external to thereby keep the internal temperature of the container constant all the time.

As will be understood from the detailed description of the invention, when the receiver system of the mobile communication base station is established outdoors, by establishing a thermal electric module with small volume, light weight, high reliability, and excellent durability in a bandpass filter (or duplex filter), a low noise amplifier, or a down-converter to be maintained at a constant temperature without a need of a refrigerant and such a mechanical driving portion as a condenser fan and employing a control circuit for controlling the thermal electric module within a proper temperature range, the outdoor receiver system can be operated in a constant temperature range so that the deterioration of characteristics caused by the change of temperature of the receiver system under a poor outdoor environment can be prevented.

Accordingly, since the outdoor receiver system can be established near an antenna, there are advantages that reception sensitivity is improved by the decrease in total noise figure and, accordingly, the difference in distance between a maximal communication for a down-link and a maximal communication for a up-link is reduced by the increase in distance of the maximal communication for the up-link.

In addition, by increasing the maximal communication distance for the up-link, an establishment interval between the base stations can be increased since a serve coverage of the base station is enlarged.

Accordingly, less number of the base station is required, which results the cost reduction of the establishment and maintenance of the base station.

In addition, by implementing the outdoor receiver system as the distribution type which is capable of being provided with power from the indoor direct power supply comprising the battery back device, a communication service is always possible since disability of reception does not occur even if such an abnormal state as electricity failure takes place. Also, by employing a direct current block including a surge arrestor in the outdoor receiver system and the indoor receiver system, the receiver systems can be protected against thunderbolt and abnormal high voltage inducible and, when direct current is applied to the outdoor receiver system through a high frequency coaxial cable, an adverse effect by the direct current on the low noise amplifier, the down-converter, or the dual directional coupler can be prevented. Also, the intensity of the signal received in the outdoor receiver system and the operation state of the system can be checked easily and conveniently in the indoor by means of the dual directional coupler.

In addition, by connecting the state monitor of the outdoor receiver system with the state matching unit by use of a distributor, a wiring error due to the increase of the number of cable can be prevented and the reason of an arisen trouble can be grasped easily and quickly.

Also, by providing a blind at regular intervals with the heat radiating plate, the effect of the direct sunlight can be prevented. Furthermore, when the thermal electric module is operated as the cooling mode, the heat radiating plate can be radiate heat efficiently by the chimney effect so that the deterioration of efficiency of the thermal electric module can be prevented.

The receiver system of this invention is applicable to a mobile communication base station, a mobile communication relay station, a land base station or relay station of a low orbit satellite as well as an analog cellular, a digital cellular, code division multiple access cellular, personal communication service, a trunked radio system, a dual paging, and wireless local loop.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. An outdoor receiver system in a mobile communication base station comprising:

a container being separable into two and having connectors on the sides of said container and heat radiating plates on the upper and lower sides of said container;

a receiving portion connected with a coaxial cable penetrating the connectors and including a bandpass filter for passing through only a desired frequency band of an input signal and a low noise amplifier for amplifying an output signal from said bandpass filter;

a metal plate provided at the bottom of said receiving portion for increasing thermal conduction;

a thermal electric module connected to said metal plate for operating as a heating mode or a cooling mode according to the change of direction of the direct current;

a controlling portion for controlling the operation of the thermal electric module according to the change of temperature of said receiving portion; and a power supplying portion for converting an alternating current into a direct current and then applying it to said receiver system;

wherein said metal plate and said thermal electric module are combined with said bandpass filter and said low noise amplifier, respectively, of said receiving portion.

2. The outdoor receiver system as set forth in claim 1, wherein a group of said metal plate, said thermal electric module, and said bandpass filter, a group of said metal plate, said thermal electric module, and said low noise amplifier, and a group of said metal plate, said thermal electric module, and said down-converter, each group including said power supplying portion and said controlling portion, are established within the respective containers.

3. The outdoor receiver system as set forth in claim 1, wherein said receiving portion further comprises a down-converter.

4. The outdoor receiver system as set forth in claim 1, wherein said receiving portion includes a duplexer filter in place of said bandpass filter.

5. The outdoor receiver system as set forth in claim 1, wherein said controlling portion comprises a temperature sensor mounted on said bandpass filter and said low noise amplifier of said receiving portion or said metal plate for generating an output determined by a thermistor whose resistance is changed with the change in temperature of said receiving portion or said metal plate and a plurality of resistor to determine the range of the operation temperature of said thermal electric module, inverting/noninverting TTL drivers for inverting/noninverting the output of said temperature sensor to a TTL level, and a thermal electric module driving portion for controlling the operation mode of said thermal electric module to be heating/cooling/stop modes by applying/blocking a direct current to said thermal electric module with the outputs of said inverting/noninverting TTL drivers.

6. The outdoor receiver system as set forth in claim 1, wherein said outdoor receiver system is implemented as a distribution type and further comprises a DC/DC converter for converting direct power supplied from an indoor direct power supply comprising a battery backup device in place of said power supplying portion into direct power to be used in said receiver system.

7. The outdoor receiver system as set forth in claim 6 further comprising a first direct current block connected between said DC/DC converter and said low noise amplifier for coupling or separating the direct current and an RF signal and a second direct current block connected between an indoor direct power supply and said down-converter, wherein said receiver system is supplied with power from said direct power supply through a high frequency coaxial cable connecting said first direct current block with said second direct current block.

8. The outdoor receiver system as set forth in claim 7, wherein each of said first and second direct current blocks includes a surge arrestor for protecting said receiver system against thunderbolt or abnormal high voltage inducible.

9. The outdoor receiver system as set forth in claim 6, wherein a blind is attached at a certain interval with said heat radiating plate of said container.

10. An outdoor receiver system in a mobile communication base station comprising:
    a container being separable into two and having connectors on the sides of said container and heat radiating plates on the upper and lower sides of said container;
    a receiving portion connected with a coaxial cable penetrating the connectors and including a bandpass filter for passing through only a desired frequency band of an input signal and a low noise amplifier for amplifying an output signal from said bandpass filter;
    a metal plate provided at the bottom of said receiving portion for increasing thermal conduction;
    a thermal electric module connected to said metal plate for operating as a heating mode or a cooling mode according to the change of direction of the direct current;
    a controlling portion for controlling the operation of the thermal electric module according to the change of temperature of said receiving portion;
    a power supplying portion for converting an alternating current into a direct current and then applying it to said receiver system; and
    a down-converter combined with said metal plate and said thermal electric module within said container.

11. The outdoor receiver system as set forth in claim 10, wherein empty space inside said container is filled with adiabatic material to enclose said receiving portion, said power supplying portion, and said controlling portion, and a fan is provided outside said container for ejecting heat from said heat radiating plate.

12. The outdoor receiver system as set forth in claim 10, wherein said metal plate and said thermal electric module are combined with said bandpass filter, said low noise amplifier, and said down-converter, respectively, of said receiving portion.

13. The outdoor receiver system as set forth in claim 12, wherein a group of said metal plate, said thermal electric module, and said bandpass filter, a group of said metal plate, said thermal electric module, and said low noise amplifier, and a group of said metal plate, said thermal electric module, and said down-converter, each group including said power supplying portion and said controlling portion, are established within the respective containers.

14. The outdoor receiver system as set forth in claim 10, wherein a group of said metal plate, said thermal electric module, and said bandpass filter, a group of said metal plate, said thermal electric module, and said low noise amplifier, and a group of said metal plate, said thermal electric module, and said down-converter, each group including said power supplying portion and said controlling portion, are established within the respective containers.

15. An outdoor receiver system in a mobile communication base station comprising:
    a container being separable into two and having connectors on the sides of said container and heat radiating plates on the upper and lower sides of said container;
    a receiving portion connected with a coaxial cable penetrating the connectors and including a bandpass filter for passing through only a desired frequency band of an input signal and a low noise amplifier for amplifying an output signal from said bandpass filter;
    a metal plate provided at the bottom of said receiving portion for increasing thermal conduction;
    a thermal electric module connected to said metal plate for operating as a heating mode or a cooling mode according to the change of direction of the direct current;
    a controlling portion for controlling the operation of the thermal electric module according to the change of temperature of said receiving portion; and
    a power supplying portion for converting an alternating current into a direct current and then applying it to said receiver system, wherein
    said outdoor receiver system is implemented as a distribution type and further comprises a DC/DC converter for converting direct power supplied from an indoor direct power supply comprising a battery backup device in place of said power supplying portion into direct power to be used in said receiver system;
    further comprising a first direct current block connected between said DC/DC converter and said low noise amplifier for coupling or separating the direct current and an RF signal and second direct current block connected between an indoor direct power supply and said down-converter, wherein said receiver system is supplied with power from said direct power supply through a high frequency coaxial cable connecting said first direct current block with said second direct current block;
    each of said first and second direct current blocks includes a surge arrestor for protecting said receiver system against thunderbolt or abnormal high voltage inducible; and said first direct current block is configured to be an integral form with said low noise amplifier.

16. An outdoor receiver system in a mobile communication base station comprising:

a container being separable into two and having connectors on the sides of said container and heat radiating plates on the upper and lower sides of said container;

a receiving portion connected with a coaxial cable penetrating the connectors and including a bandpass filter for passing through only a desired frequency band of an input signal and a low noise amplifier for amplifying an output signal from said bandpass filter;

a metal plate provided at the bottom of said receiving portion for increasing thermal conduction:

a thermal electric module connected to said metal plate for operating as a heating mode or a cooling mode according to the change of direction of the direct current;

a controlling portion for controlling the operation of the thermal electric module according to the change of temperature of said receiving portion; and a power supplying portion for converting an alternating current into a direct current and then applying it to said receiver system;

wherein said outdoor receiver system is implemented as a distribution type and further comprises a DC/DC converter for converting direct power supplied from an indoor direct power supply comprising a battery backup device in place of said power supplying portion into direct power to be used in said receiver system; and further comprising an indoor dual directional coupler connected between said indoor direct current block and said down-converter for checking the intensity of a received signal and the operation state of said receiver system.

17. An outdoor receiver system in a mobile communication base station comprising:

a container being separable into two and having connectors on the sides of said container and heat radiating plates on the upper and lower sides of said container;

a receiving portion connected with a coaxial cable penetrating the connectors and including a bandpass filter for passing through only a desired frequency band of an input signal and a low noise amplifier for amplifying an output signal from said bandpass filter;

a metal plate provided at the bottom of said receiving portion for increasing thermal conduction;

a thermal electric module connected to said metal plate for operating as a heating mode or a cooling mode according to the change of direction of the direct current;

a controlling portion for controlling the operation of the thermal electric module according to the change of temperature of said receiving portion; and a power supplying portion for converting an alternating current into a direct current and then applying it to said receiver system;

wherein said outdoor receiver system is implemented as a distribution type and further comprises a DC/DC converter for converting direct power supplied from an indoor direct power supply comprising a battery backup device in place of said power supplying portion into direct power to be used in said receiver system; and further comprising, when a state monitor is provided in said outdoor receiver system to monitor said outdoor receiver system, an outdoor distributor for communicating said state monitor with an indoor state matching unit.

* * * * *